(12) United States Patent
Kashiwai et al.

(10) Patent No.: US 7,328,608 B2
(45) Date of Patent: Feb. 12, 2008

(54) SENSOR UNIT

(75) Inventors: Mikio Kashiwai, Saitama (JP);
Hisamitsu Takagi, Saitama (JP); Goro Komatsu, Saitama (JP); Yasunori Yoshimura, Saitama (JP); Toshiyuki Hosokawa, Saitama (JP); Yousuke Sekino, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 124 days.

(21) Appl. No.: 11/202,407

(22) Filed: Aug. 11, 2005

(65) Prior Publication Data

US 2006/0038670 A1 Feb. 23, 2006

(30) Foreign Application Priority Data

Aug. 19, 2004 (JP) ............................ 2004-239445

(51) Int. Cl.
*G01M 17/02* (2006.01)

(52) U.S. Cl. ........................................... 73/146

(58) Field of Classification Search ............... 73/146; 340/447; 152/152.1
See application file for complete search history.

(56) References Cited

U.S. PATENT DOCUMENTS

| | | | | |
|---|---|---|---|---|
| 4,334,215 A | * | 6/1982 | Frazier et al. ............. | 340/447 |
| 5,500,065 A | * | 3/1996 | Koch et al. ............... | 156/123 |
| 5,562,787 A | * | 10/1996 | Koch et al. ............... | 156/64 |
| 5,573,610 A | * | 11/1996 | Koch et al. ............... | 152/152.1 |
| 5,573,611 A | * | 11/1996 | Koch et al. ............... | 152/152.1 |
| 5,708,411 A | * | 1/1998 | Hill ........................... | 340/447 |
| 6,217,683 B1 | | 4/2001 | Balzer et al. | |
| 6,885,291 B1 | * | 4/2005 | Pollack et al. .............. | 340/445 |
| 7,091,840 B2 | * | 8/2006 | Ichinose .................... | 340/447 |
| 2005/0262934 A1 | * | 12/2005 | Naidu et al. ............... | 73/146 |

FOREIGN PATENT DOCUMENTS

| | | |
|---|---|---|
| JP | 55-99404 | 7/1980 |
| JP | 08-67117 A | 3/1996 |
| JP | 09-136517 | 5/1997 |
| JP | 10315720 | 12/1998 |
| JP | 2002-524326 | 8/2002 |
| JP | 2002-541003 T | 12/2002 |
| JP | 2003-205716 | 7/2003 |
| JP | 2003-205716 A | 7/2003 |
| WO | WO 00/07834 | 2/2000 |

* cited by examiner

*Primary Examiner*—Andre J. Allen
(74) *Attorney, Agent, or Firm*—Carrier, Blackman & Associates, P.C.; William D. Blackman; Joseph P. Carrier (57) ABSTRACT

A sensor unit includes a sensor body consisting of a detecting part which detects an inside pressure of a tire, and a transmitting part which transmits a pressure signal detected by the detecting part, and a base member which holds the sensor body. The base member is fixed to a wheel through a heat curable adhesive layer.

18 Claims, 5 Drawing Sheets

SENSOR UNIT

CROSS-REFERENCE TO RELATED APPLICATIONS

The present invention claims priority under 35 USC 119 based on Japanese patent application. 2004-239445, filed Aug. 19, 2004. The entire disclosures of this Japanese patent application is incorporated herein by reference.

BACKGROUND OF THE INVENTION

1. Field of the Invention
2. Discussion of Background Art

The present invention relates to a sensor unit for use in a system for monitoring the inside of a tire.

Conventionally, various proposals have been made for Tire Pressure Monitoring Systems (TPMS) which can monitor the inside pressures, etc. of tires attached to a vehicle. These kinds of pressure monitoring systems are constructed such that a sensor for detecting the inside pressure of a tire is fixed to a wheel. One example of a mounting structure of such pressure monitoring systems is disclosed in Japanese Laid-open Patent Application No. 2003-205716 (paragraphs [0015] to [0022]; FIGS. 1 and 3). In the sensor unit disclosed in Japanese Laid-open Patent Application No. 2003-205716, a base member is fixed in a predetermined position on the rim of a wheel by welding or screw-threaded engagement, followed by sandwiching a sensor body 3). In the sensor unit disclosed in Japanese Laid-open Patent Application No. 2003-205716, a base member is fixed in a predetermined position on the rim of a wheel by welding or screw-threaded engagement, followed by sandwiching a sensor body between the base member and another fixing member. Other proposals have been made such that the sensor body is integrally formed with a tire valve.

However, in the above sensor unit disclosed in Japanese Laid-open Patent Application No. 2003-205716, the base member has to be fixed, for example, by welding after positioning the base member on the rim of the wheel, which requires a time-consuming mounting operation. In cases where the base member is screw-threaded on the rim, it is necessary to prepare a dedicated wheel having screw holes or to form screw holes when an existing wheels is used, which also requires a time-consuming mounting operation.

To ease the mounting operation, it has been proposed that the base member be fixed to the rim with pressure sensitive adhesive. However, since pressure sensitive adhesive does not provide a sufficient adhesion force, the base member may be peeled off from the wheel by the centrifugal force caused by the rotation of the tire, causing the sensor body to be separated from the wheel.

Further, in the sensor unit of which sensor body is integrally formed with the tire valve, a load is focused around the tire valve, which is likely to cause the wheel to become unbalanced. For this reason, it is necessary to attach a weight for adjusting the wheel balance. Therefore, integrally forming the sensor body with the tire valve would disadvantageously deteriorate the maintenance.

In view of the above, it is an object of the present invention to provide a sensor unit which can realize a simple mounting operation of the sensor and which can enhance the long term reliability of adhesiveness.

SUMMARY OF THE INVENTION

It is one aspect of the present invention to provide a sensor unit for a tire. The sensor unit, in this aspect, includes a sensor body including a detecting part which detects an inside variable of a tire, a transmitting part which transmits a signal based on the variable detected by the detecting part, a base member which holds the sensor body, and a heat curable adhesive layer adapted to fix the base member to a wheel.

According to the present invention, since the base member is fixed to the wheel with adhesive, the mounting operation of the base member can be eased. Further, since the base member is fixed to the wheel with a heat curable adhesive layer which can provide a high adhesive force after being cured, it is possible to reliably prevent the sensor body from becoming separated from the wheel. Using the heat curable adhesive layer allows the adhesive layer to be cured by making use of heat during the drying process for wheel manufacturing. Therefore, no extra, dedicated equipment is required for heating and curing the adhesive layer.

In the aforementioned sensor unit, the base member may be fixed to a rim of the wheel. Such an arrangement allows the sensor body to be fixed in an arbitrary position on the outer peripheral surface of the rim. Therefore, if the wheel balance (static balance/kinetic balance) becomes inaccurate, the sensor body can be mounted in such a position as to compensate the inaccuracy. This can eliminate a need for mounting a balance adjustment weight. Further, since the base member is formed separately from the tire valve, the maintenance of the valve will not be impaired.

In the aforementioned sensor unit, the base member may be fixed to a well of the rim. Such an arrangement allows the sensor body to be installed in a position where the tire hardly contacts with the sensor body while the tire is assembled with the wheel. Therefore, it is possible to eliminate an adverse effect on the tire assembling operation.

In the aforementioned sensor unit, the sensor body may be detachably held on the base member. Such an arrangement allows the sensor unit to be replaced easily when the sensor body malfunctions or the battery is run out.

Further, in the aforementioned sensor unit, the heat curable adhesive layer may be a sheet-like member, both sides of which are coated with adhesive. This can improve the handleability when providing the adhesive layer on the base member, which can ease the mounting operation for mounting the base member to the wheel.

BRIEF DESCRIPTION OF THE DRAWINGS

The above and other aspects of the present invention will become more apparent from the following detailed description of illustrative, non-limiting embodiments thereof with reference to the accompanying drawings, in which.

DETAILED DESCRIPTION OF THE INVENTION

With reference to the accompanying drawings, preferred embodiments of the present invention will be described below.

Figure 2:
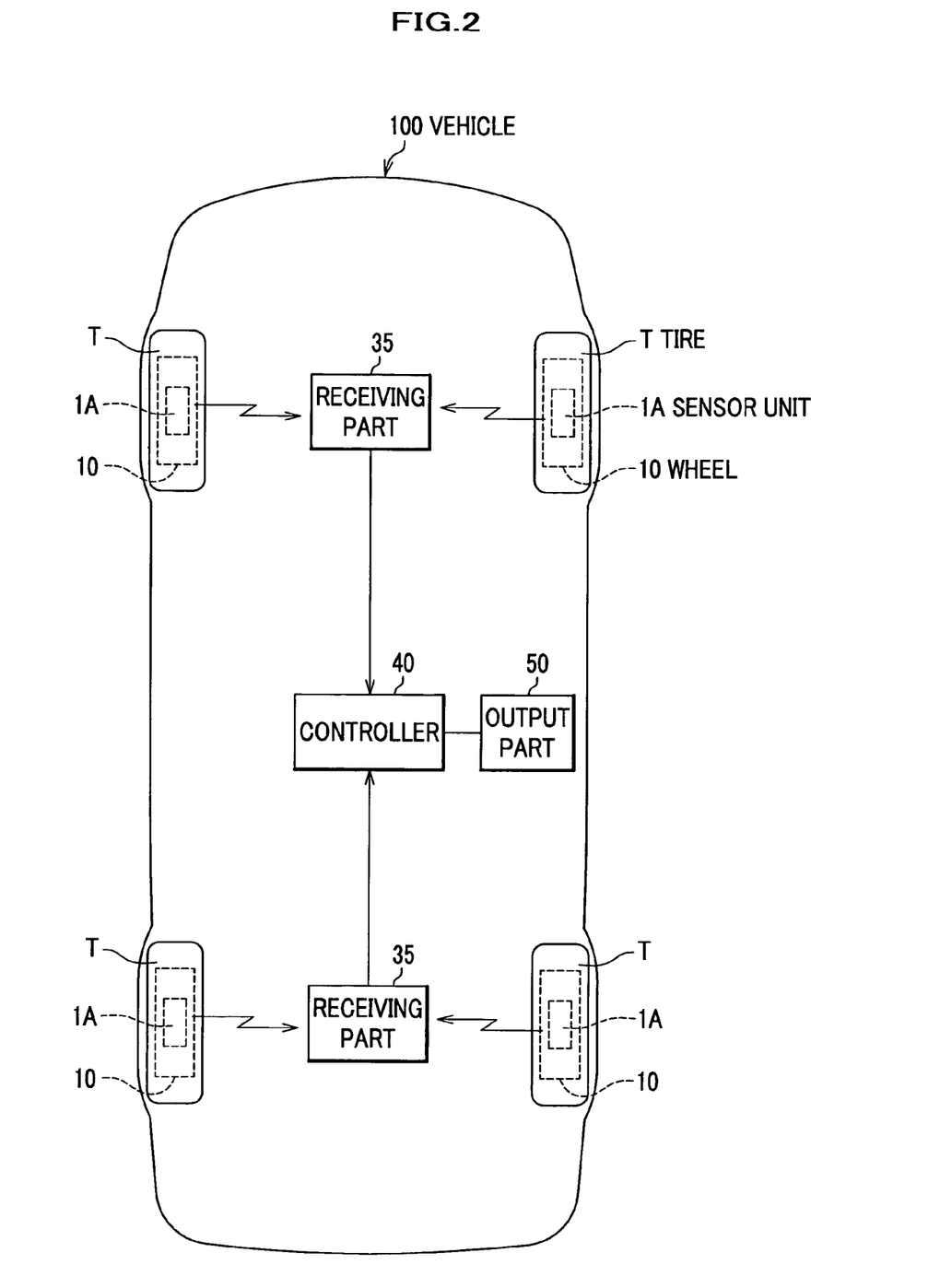
FIG. 2 is a schematic view of a vehicle body showing an arrangement of a monitoring system for tires using the sensor unit of the present invention.

As shown in FIG. 2, a sensor unit 1A is used with a monitoring system for monitoring the inside of a tire T, and is mounted on a wheel 10 of each tire T attached thereto of a vehicle 100. The sensor unit 1A includes a detecting part (not shown) which consists, for example, of a pressure sensor for detecting the inside pressure of the tire T attached to the wheel 10 and/or a temperature sensor for detecting the inside temperature of the tire T, and a transmitting part (not shown) which transmits a signal containing pressure information or temperature information detected by the detecting part to the vehicle body of the vehicle 100 as an electric wave. The vehicle 100 is provided with receiving parts 35, 35 for receiving the signal transmitted from the transmitting part, a controller 40 for carrying out predetermined processes based on the signal, and an output part 50 for outputting a state of the tire T based on the processing result of the controller 40. The sensor unit 1A operates to transmit the signal to the receiving part 35, for example, at a certain period of time, so that when the controller 40 receives a signal indicating an unusual state of the pressure or temperature of the tire T, the controller 40 controls the output part 50 to turn on a warning lamp or to indicate a warning signal. This system is merely an example, and the present invention is not limited to this particular embodiment.

Figure 1:
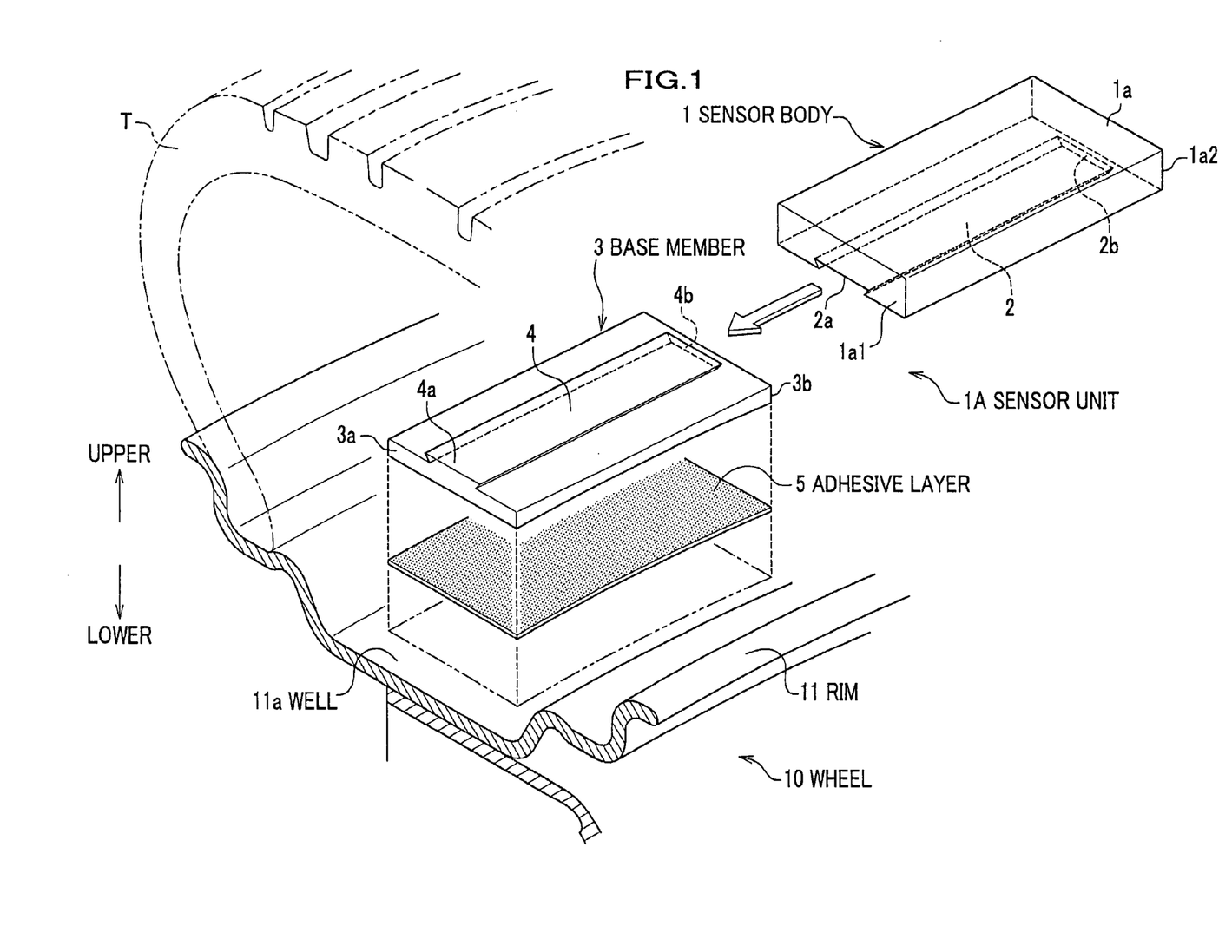
FIG. 1 is an exploded perspective view of a sensor unit according to one embodiment of the present invention, illustrating a state before the sensor unit is mounted on a wheel.

As shown in FIG. 1, the sensor unit 1A according to this embodiment includes a sensor body 1 and a base member 3, and the base member 3 is fixed to the wheel 10 through an adhesive layer 5.

The sensor body 1 includes a case 1a in the shape of a rectangular box and made of synthetic resin or the like. Accommodated in the case 1a are the detecting part and the transmitting part. The sensor body 1 is provided with an elongate slide groove 2 having a base-contacting surface including a first shape having a predetermined width in the lower surface of the case 1a. The slide groove 2 is formed to have a length such that one end 2a thereof extends from an end surface 1a1 of the case 1a and the other end 2b does not reach an end surface 1a2.

The base member 3 is in the shape of a plate and made of synthetic resin or the like. Formed integrally on the upper surface of the base member 3 is an elongate protrusion 4 having a sensor-contacting surface, including a second shape having a predetermined width which corresponds to the width of the shape of the base-contacting surface, for removably attaching the sensor body to the base member 3 without requiring extra fasteners. The protrusion 4 is formed to have a length slightly smaller than the elongation length of the base member 3 so that one end 4a of the protrusion 4 extends from an end surface 3a of the base member 3 and the other end 4b positions slightly inward of an end surface 3b.

The adhesive layer 5 is formed as a sheet-like member with heat curable adhesive coated on both upper and lower surfaces of the substrate member. As the heat curable adhesive layer 5, for example, a semi-structural acrylic form tape (produced by (C) Sumitomo 3M) wherein heat curable acrylic adhesive is coated on both sides of a heat curable acrylic form substrate may be employed. Using the semi-structural acrylic form tape produced by this company gives excellent workability and adhesion property same as those of the normal pressure-sensitive adhesive tape before heating, and an extremely high conclusive adhesion force after heating and curing.

Upon mounting the sensor unit 1A on the wheel 10, one side of the adhesive layer 5 is attached to the lower surface of the base member 3 and the other side of the adhesive layer 5 is attached to a well 11a of the rim 11 of the wheel 10. The adhesive layer 5 is then cured under a predetermined heating condition while the base member 3 adheres to the wheel 10. After the adhesive layer 5 is cured, the sensor body 1 is mounted on the base member 3. Since the adhesive layer 5 can be cured separately from the sensor body 1 before the sensor body 1 is mounted on the base member 3, it is possible to prevent the sensor body 1 from being exposed to heat during the heating/curing operation.

When the sensor body 1 is mounted on the base member 3, one end 2a of the sensor body 1 is faced to the other end 4b of the protrusion 4 followed by moving the sensor body in the direction of the arrow. The sensor body 1 therefore slides on the base member 3 while the slide groove 2 is guided along the protrusion 4. This sliding movement of the sensor body 1 is restricted at a predetermined position of the base member 3 when the other end 2b of the slide groove 2 abuts on the other end 4b of the protrusion 4. As described above, since the sensor body 1 can be mounted on the base member 3 while sliding the sensor body 1, it is possible to ease the mounting operation. In other words, the step of the removably attaching the sensor body 1 to the base member 3 comprises sliding the sensor body 1 along the base member 3 such that the sensor-contacting surface of the base member 3 removably engages the base-contacting surface of the sensor body 1 to removably dispose the sensor body thereon.

According to this embodiment, the cross-section of the slide groove 2 and the cross-section of the protrusion 4 are both trapezoidal such that the higher the cross-sectional portion, the wider it becomes. Therefore, the sensor body 1 does not move away from the base member 3 in the direction (upward/downward direction) where they are remote from each other. Although not shown in the figure, it is preferable to provide a stopper means because the sensor body 1 may be disadvantageously pulled off from the base member 3 when the vehicle 100 abruptly accelerates or decelerates. Various known methods, such as screw-threaded engagement between the sensor body 1 and the base member 3, and fitting engagement between protrusions and recesses provided on/in the sensor body 1 and the base member 3, may be employed as the stopper means.

As described previously, since the base member 3 for holding the sensor body 1 is adhered and fixed to the wheel 10, it is possible to ease the mounting operation. Further, the sensor body 1 and the base member 3 can be fixed to the wheel 10 at an arbitrary position on the outer peripheral surface of the rim 11, so that if the wheel balance is unbalanced and the wheel 10 has an area where it is lighter than the other area, the base member 3 can be attached to this area to improve the wheel balance. As a result, it is not necessary to apply or attach a weight for adjusting the wheel balance to the wheel 10.

Figure 3:
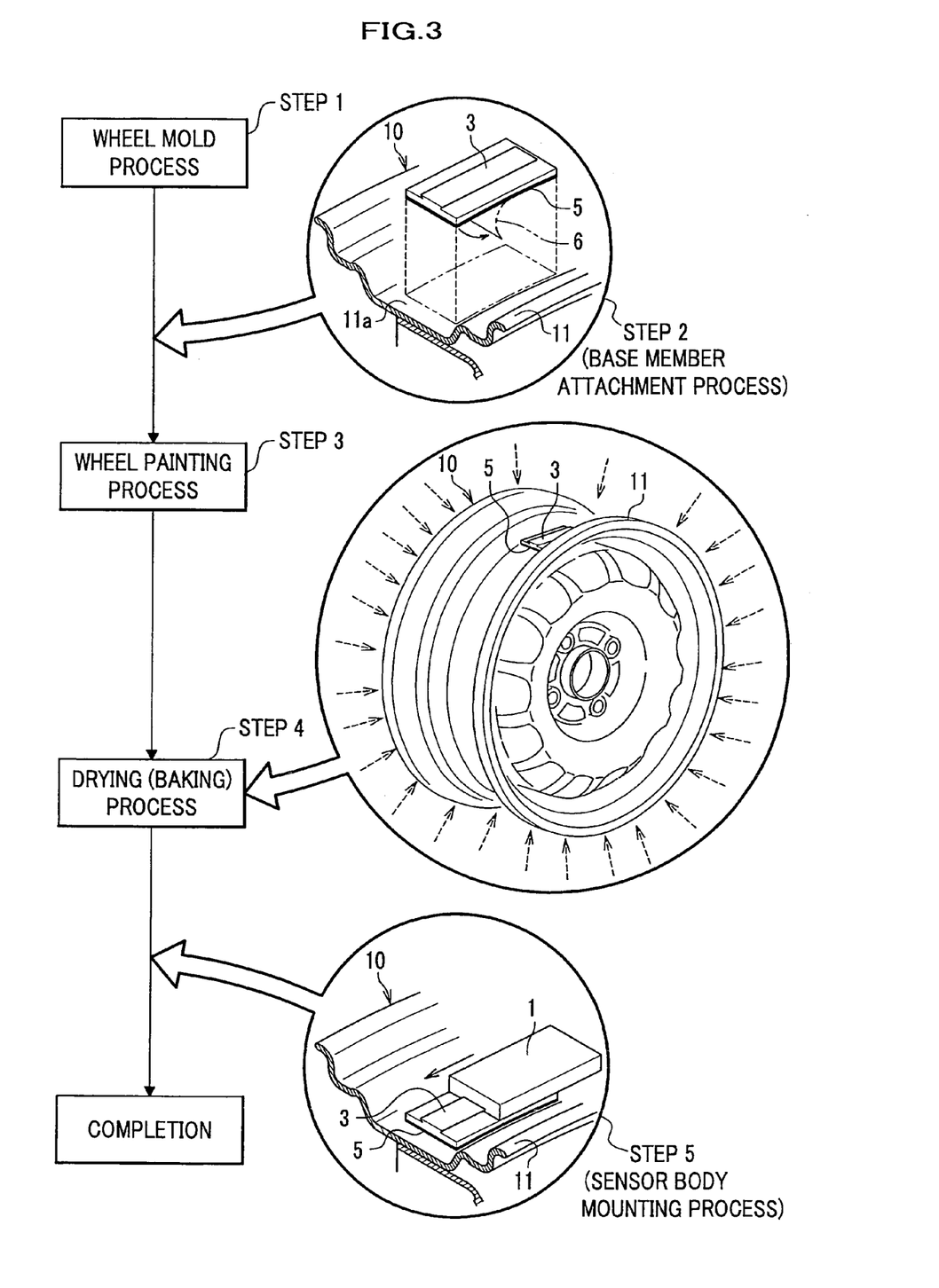
FIG. 3 is a flow diagram showing the mounting process for the sensor unit which is incorporated in the mass production process for manufacturing wheels.

As shown in FIG. 3, using the heat curable adhesive layer 5 allows the process for mounting the sensor unit 1A (steps 2 and 5) to be incorporated into the conventional wheel mass production process (steps 1, 3 and 4).

As shown in FIG. 3, in a wheel mold process of step 1, wheels 10 are formed using a predetermined mold. After molding the wheel, the base member 3 is attached to the wheel 10 through the adhesive layer 5 in a base member attachment process of step 2. One side of the adhesive layer 5 is provided with a peel-off sheet 6 made of synthetic resin, and the adhesive layer 5 can be attached to the base member 3 without peeling the peel-off sheet 6, improving the workability. The peel-off sheet 6 is then removed from the adhesive layer 5 that is adhered to the base member 3, and the base member 3 is pressed against and attached to the well 11a of the rim 11 in such a manner that the adhesive-coated surface faces to the well 11a. The operation proceeds to a wheel painting process of step 3, and the wheel 10 is coated with a predetermined paint. The wheel 10 is then dried (baked) in the following drying (or baking) process of step 4 with the base member 3 adhered to the wheel 10. After this drying (baking) process, the sensor body 1 is mounted on the base member 3 in a sensor body mounting process of step 5.

As described above, in the wheel mass production process, it is possible to cure the adhesive layer 5 by making use of heat generated in the drying (baking) process for wheels 10 so that the base member 3 can be fixed to the wheel 10. Therefore, it is not necessary to provide extra, dedicated equipment for fixing the base member 3 to the wheel 10. Further, using the heat curable adhesive layer 5 enables the base member 3 to be strongly adhered to the wheel 10, which can reliably prevent the sensor body 1 from falling away from the wheel 10. The wheel mass production process illustrated in FIG. 3 shows one example, and the process for mounting the sensor unit 1A can be applied to other wheel mass production processes.

Figure 4:
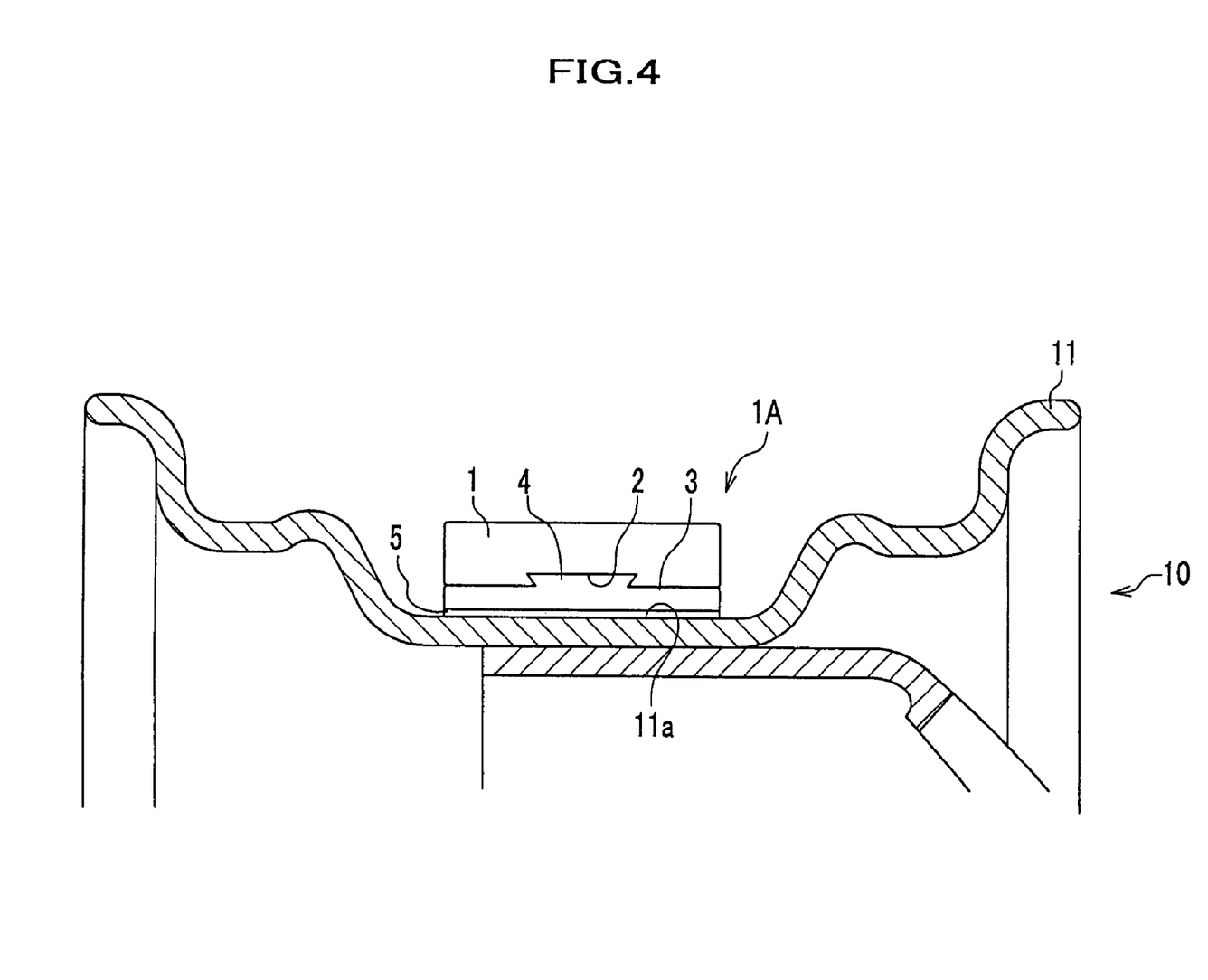
FIG. 4 is a sectional view illustrating the sensor unit after being mounted on a wheel.

According to this embodiment, the sensor unit 1A is fixed to the well 11a of the rim 11 of the wheel 10 as shown in FIG. 4, so that the tire T hardly contacts with the sensor body 1 while the tire T is assembled with the wheel (see FIG. 1).

Although not shown in the figure, different sized or shaped base members 3 may be prepared in consideration of the rim diameter of each wheel 10 such that the engagement between the sensor body 1 and the base member 3, that is, the engagement between the slide groove 2 formed in the sensor body 1 and the protrusion 4 provided on the base member 3 can be commonly made for all kinds of base members 3 and only one kind of sensor body 1 can be used for all the rim diameters. Providing a common sensor body 1 for all kinds of base members 3 can lead to cost reduction.

Figure 5:
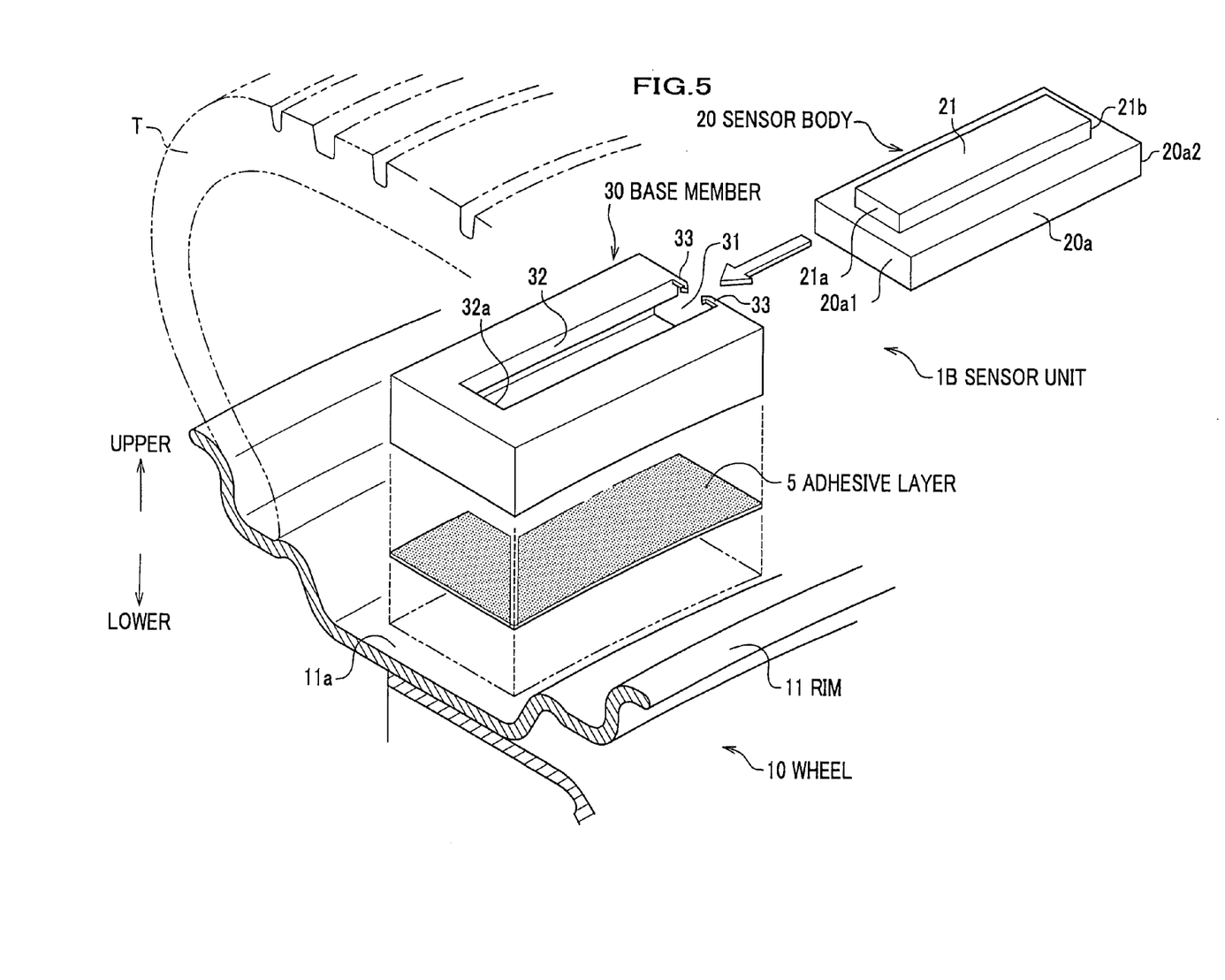
FIG. 5 is an exploded perspective view illustrating a modified embodiment of the sensor unit.

A sensor unit 1B as shown in FIG. 5 consists of a sensor body 20 and a base member 30. This sensor unit 1B is substantially the same as the sensor unit as shown in FIG. 1 except for its shape.

The sensor body 20 includes a case 20a in the shape of a rectangular box, the upper surface of which is provided with an elongate protrusion 21 having a predetermined width. The protrusion 21 has a length such that the size in the elongation direction is shorter than the case 20a and that the both ends 21a, 21b of the protrusion 21 do not protrude from the end surfaces 20a1, 20a2 of the case 20a.

The base member 30 includes a receiving portion 31 for receiving therein the sensor body 20. The receiving portion 31 is a space for slidably accommodating the sensor body 20 without play, and an opening 32 is formed on the receiving portion 31 along the elongation direction of the base member 30. Stopper nails 33, 33 are formed in the opening 32 at an end portion, from which the sensor body 20 is inserted, in a manner oppositely protruding to each other. When the sensor body 20 is inserted into the receiving portion 31 of the base member 30, the stopper nails 33, 33 are elastically deformed to receive the sensor body 20. When the end 21a of the protrusion 21 is continuously inserted and abuts on the end 32a of the opening 32, the stopper nails 33, 33 recover elastically to hold the sensor body 20 and to prevent the sensor body 20 from coming off from the base member 30.

A sensor unit according to the present invention is not limited to the above embodiments. It should be understood that one skilled in the art can modify or change the sensor body and/or the base member. Further, the sensor body 1, 21 is not limited to the specific embodiment to be detachably held on the base member 3, 30, and the sensor body 1, 21 may be adhered to the base member 3, 30.

What is claimed is:

1. A sensor unit for a tire, said sensor unit comprising:
    a sensor body including a detecting part which detects an inside variable of a tire,
        said sensor body comprising:
            a base-contacting surface having a first shape, and
            a transmitting part which transmits a signal based on the variable detected by the detecting part;
    a base member which holds the sensor body,
        said base member comprising a sensor-contacting surface having a second shape corresponding to said first shape;
    wherein:
        the second shape engages the first shape of the base-contacting surface of the sensor body such that the sensor body is removably attachable thereto without requiring extra fasteners; and
        the base member is fixed to a wheel using a heat curable adhesive layer.

2. A sensor unit according to claim 1, wherein the base member is fixed to a rim of the wheel.

3. A sensor unit according to claim 2, wherein the base member is fixed to a well of the rim.

4. A sensor unit according to claim 1, wherein the sensor body is detachably held on the base member.

5. A sensor unit according to claim 1, wherein the heat curable adhesive layer is a sheet-like member having two opposed sides which are both coated with adhesive.

6. A sensor unit according to claim 1, wherein the variable comprises at least one of pressure and temperature.

7. A sensor unit according to claim 1, wherein one of the base member and the sensor body includes a protrusion and the other of the base member and the sensor body includes a receiving portion which slidably receives the protrusion when the sensor body is held by the base member.

8. A sensor unit according to claim 7, further including a stopper to prevent the sensor body from being separated from the base member when the sensor body is held by the base member.

9. A sensor unit according to claim 1, wherein the heat curable adhesive layer comprises a semi-structural acrylic form tape.

10. A method of attaching a sensor unit including a base member and a sensor body to a wheel, said method comprising the steps of:
    applying a heat curable adhesive layer to the base member;
    attaching the base member to the wheel via the heat curable adhesive layer;
    heating the heat curable adhesive layer to cure same; and
    removably attaching the sensor body to the base member.

11. A method of claim 10, wherein the base member is fixed to a rim of the wheel.

12. A method of claim 11, wherein the base member is fixed to a well of the rim.

13. A method of claim 10, wherein the sensor body is detachably held on the base member without requiring extra fasteners.

14. A method of claim 10, wherein the heat curable adhesive layer is a sheet-like member having two opposed sides which are both coated with adhesive.

15. A method of claim 10, wherein the heat curable adhesive layer comprises a semi-structural acrylic form tape.

16. A method of claim 10, wherein the sensor unit detects at least one of pressure and temperature within a tire attached to the wheel.

17. The method of claim 10, wherein the sensor body comprises a base-contacting surface having a first shape;
   wherein the base member comprises a sensor-contacting surface configured to correspond to said first shape and to engage the base-contacting surface of the sensor body; and
   wherein the step of removably attaching the sensor body to the base member comprises sliding the sensor body along the base member such that the sensor-contacting surface of the base member removably engages the base-contacting surface of the sensor body to removably dispose the sensor body thereon.

18. A tire monitoring system comprising
   a sensor unit which monitors tire pressure and temperature;
   said sensor unit comprising
      a sensor body having a groove; and
      a base member having a protrusion; wherein said protrusion corresponds to said groove of the sensor body;
   wherein
      said sensor body is removably attached to the base member and held in position using a stopper, and
      said base member is fixedly attached to a rim of wheel using an adhesive layer.

\* \* \* \* \*

UNITED STATES PATENT AND TRADEMARK OFFICE
CERTIFICATE OF CORRECTION

| | | |
|---|---|---|
| PATENT NO. | : 7,328,608 B2 | Page 1 of 1 |
| APPLICATION NO. | : 11/202407 | |
| DATED | : February 12, 2008 | |
| INVENTOR(S) | : Kashiwai et al. | |

It is certified that error appears in the above-identified patent and that said Letters Patent is hereby corrected as shown below:

<u>Title page</u>:
    In the title, item (54), change "SENSOR UNIT" to --SENSOR UNIT FOR MONITORING A TIRE CONDITION, AND METHOD OF ATTACHING SAME TO A TIRE--.

<u>Column 1</u>:
    Line 1, change "SENSOR UNIT" to --SENSOR UNIT FOR MONITORING A TIRE CONDITION, AND METHOD OF ATTACHING SAME TO A TIRE--.

Signed and Sealed this

Twenty-fourth Day of June, 2008

JON W. DUDAS
*Director of the United States Patent and Trademark Office*